MEMORY USING SENSE AMPLIFIERS WITH GATED FEEDBACK

Filed Jan. 28, 1965 2 Sheets-Sheet 1

INVENTORS A. W. KLIBBE
W. M. REGITZ
BY
Charles Scott Phelan
ATTORNEY

Aug. 19, 1969 A. W. KLIBBE ET AL 3,462,748

MEMORY USING SENSE AMPLIFIERS WITH GATED FEEDBACK

Filed Jan. 28, 1965 2 Sheets-Sheet 2

3,462,748
MEMORY USING SENSE AMPLIFIERS WITH GATED FEEDBACK

Arthur W. Klibbe, Neptune, and William M. Regitz, Colonia, N.J., assignors to Bell Telephone Laboratories, Incorporated, New York, N.Y., a corporation of New York Filed Jan. 28, 1965, Ser. No. 428,759
Int. Cl. G11b 5/02
U.S. Cl. 340—174 14 Claims

ABSTRACT OF THE DISCLOSURE

A store system containing a magnetic memory wherein one set of coordinate drive circuits, which is also used to supply readout signals to sensing amplifiers, is provided with gated negative feedback circuits on such amplifiers. The gating fixes the amount of negative feedback in a stepwise fashion to different levels for reading and writing portions of the memory operating cycle. The sensing amplifier is thus continuously operatively coupled to the digit circuits but is at the same time comparatively insensitive to the drive signals also applied to such circuits to the extent that such drive signals are unable to drive the amplifier into saturated conduction. The feedback control is so exercised that the amplifier presents a substantially constant impedance to the digit circuit with which it is associated, and minimum memory operating times are realized by fixing that constant impedance at the critical damping impedance for the sensing circuit.

This invention relates to magnetic memory systems and more particularly it relates to an improvement in 2-wire magnetic memory systems.

Programmed data processing systems usually employ at least one memory for storing data words, or program instruction words, or both. Suitable program control circuitry addresses the memory locations containing instructions in a predetermined sequence of locations in order to obtain the instructions of the program and execute them in an appropriate manner. Coincident current magnetic memories of various types are often utilized in such data processing systems. Such a memory includes a plurality of bistable magnetic devices arranged in a coordinate array with row and column circuits linking the devices. One problem encountered in coincident current memories is noise which is generated in the memory output during a write-in operation and produces effects that linger and interfere with the following read-out operation. The noise effects tend to block proper operation of the memory output circuits.

In a typical 4-wire magnetic memory, each device is linked by one row circuit and one column circuit for applying coincident current read and write pulses. Each device is also linked by an inhibit circuit and a read-out sensing circuit that supplies memory read-out signals to a sensing amplifier. The four mentioned circuits are all utilized in the operation of the memory as is well known in the art. In particular, however, the sensing circuit is arranged to link the storage devices in different senses with respect to the inhibit circuit in order to reduce the magnitude of write-in currents induced in the sensing circuit and thereby reduce the tendency to block the sensing amplifier.

In a 2-wire memory system the same row and column circuits link each storage device, but no separate sensing and inhibit circuits are provided because the row and column circuits serve dual functions. Half-select write currents are applied in coincidence to a row circuit and to selected column circuits in order to write a desired set of binary coded ONE and ZERO information bits into storage in the memory devices coupled to the row circuit. A sensing amplifier is coupled to each of the column circuits, and during the memory read interval a full-select current pulse is applied to a desired row circuit to cause simultaneous read-out through the column circuits from all devices coupled to that row circuit.

The 2-wire type of memory has certain advantages over the 4-wire type in that fewer circuits are required to link the memory storage devices so that there is less labor cost involved in manufacturing the memory. Also, the 2-wire memory produces unipolar read-out signals which are easier to detect than are the bipolar signals of the 4-wire memory. However, the dual use of a column circuit as a digit write and sensing circuit makes it impossible to employ the noise cancellation schemes employed in 4-wire memories. A substantial time guard interval might be left after the write-in interval to permit the sensing amplifier connections to return to a quiescent condition before a read-out signal is received, but this time is usually not available. In one 2-wire memory system the read and write drive pulses have been formed with substantially different frequency spectra so that a bandpass filter in the sensing amplifier input circuit can be used to reduce the effects of write pulses on the sensing amplifier. However, the use of different frequency spectra for the different types of drive pulses forces one of the read or write drive pulses to be substantially longer in duration than the other and thereby forces the memory operating cycle to be much longer than can be tolerated for many applications.

A 2-wire memory system could also use an in-line strobed gating circuit in the amplifier input to enable such input connections during only the read intervals. However, the in-line gating circuits cause voltage disturbances in the operating point of the sensing amplifier. Those disturbances must be dissipated during a time guard interval following a write-in interval, and this procedure also extends the memory operating cycle over an excessively long time.

It is therefore one object of the present invention to reduce the operating time of magnetic memories.

An additional object is to reduce the effect of write-in-generated noises in a memory sensing amplifier.

It is another object to reduce the operating time of 2-wire magnetic memory systems.

A further object is to facilitate the utilization of a single circuit in a magnetic memory both for the application of a memory drive pulse and for memory output sensing purposes.

These and other objects of the invention are achieved in an illustrative embodiment in a 2-wire magnetic memory system wherein magnetic storage devices in a coordinate array are controlled by row and column circuits. Each column circuit of the memory is adapted to receive a drive current pulse at one time and to apply sensing pulses to a sensing amplifier at another time. The sensing amplifiers of all column circuits include negative feedback circuits with gating means therein which are adapted to reduce the feedback of each amplifier during the read-out portion of the memory cycle to amplify the mentioned sensing pulses. Consequently, the amplifier has a relatively low gain for signals applied thereto from the column circuit during the memory write-in time when the mentioned drive current pulse occurs. The low gain is proportioned so that the maximum anticipated noise appearing in the sensing circuit output during write-in time is unable to drive the amplifier out of its linear operating range. However, during the read-out interval the feedback of the amplifier is reduced so that read-out pulses are amplified to a sufficiently high level to enable the discriminator circuit to distinguish between binary ONE and ZERO signals.

It is one feature of the invention that read and write pulses of similar frequency content are utilized to operate the memory without unduly disturbing the sensing amplifiers and without unduly extending the memory operating cycle.

It is another feature that each column circuit is continuously coupled to the input of its sensing amplifier circuit without intervening time gating structures to disturb the direct-current operating point of the amplifier.

Another feature of the invention is that the sensing amplifier gain during memory write-in time is so low that the largest anticipated noises in the column circuits are not able to drive the amplifier out of its linear operating range.

Still another feature is that the amplifier input impedance is continuously substantially uniform at a level corresponding approximately to the critical damping level so that any tendency for the column circuit to ring or for column circuit signal transients to be unduly extended is minimized.

Yet another feature is that the use of gated feedback sensing amplifiers permits the memory circuits which accommodate drive pulses and read-out signals to link all memory storage devices in the same sense.

A further feature of the invention is that feedback gating circuits are adapted to produce no significant disturbance in the direct-current operating point of the sensing amplifier when such gating circuits are operated.

An additional feature of the invention is that in each binary signal discriminator the discriminator threshold function is performed separately from the discriminator pulse regenerating function so that the pulse regenerator responds rapidly when it is triggered by a binary ONE signal.

The various objects, features, and advantages of the invention may be more fully understood upon a consideration of the following detailed description of an illustrative embodiment in connection with the appended claims and the attached drawing in which:

Figure 1:
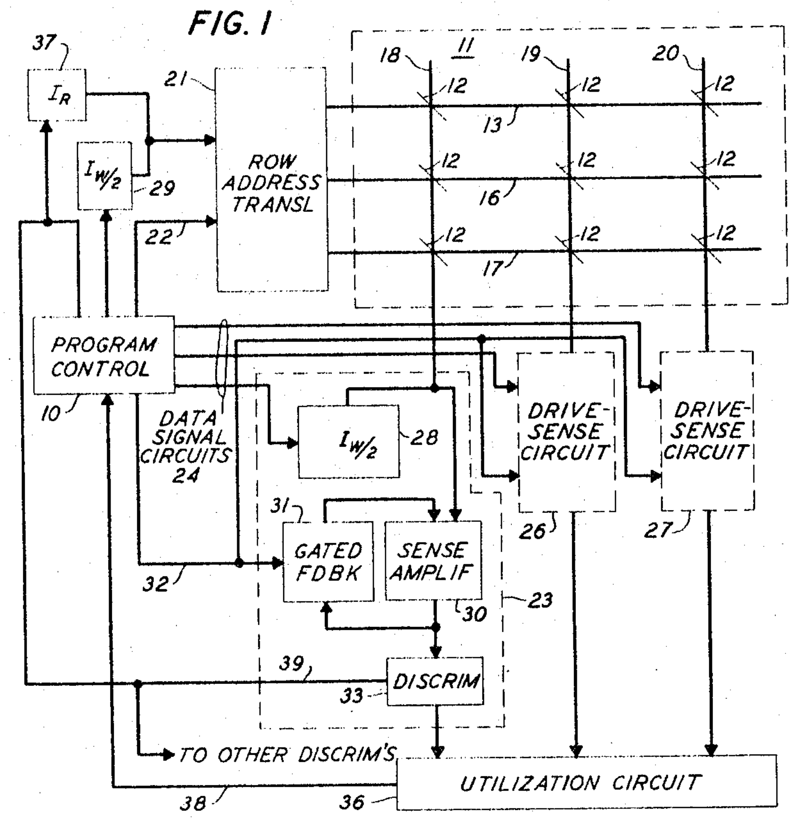
FIG. 1 is a simplified block and line diagram of a portion of a data processing system utilizing the invention.

In FIG. 1 the data processing system includes a program control circuit 10 which exercises supervision over the application of drive pulses and address signals to a magnetic memory 11. The memory is indicated in simplified form as a 3 x 3 coordinate array of toroidal magnetic cores 12. Each core is a bistable magnetic device with a substantially rectangular hysteresis characteristic defining two stable conditions of remanent magnetic flux of opposite polarity. Different groups of cores are linked by separate row circuits 13, 16, and 17, and the same cores in different grouping are also linked by separate column circuits 18, 19, and 20, as is well known in the art. Since the memory 11 operates in a 2-wire, word organized mode, as will be described, no separate sensing circuits or separate inhibit circuits are provided.

The program control 10 supplies address signals through a circuit 22 to a row address translator 21 which responds thereto for selecting a particular one of the row circuits for writing in a word of binary coded information. Data signal circuits 24 couple signals representing the binary coded information to be stored in memory 11 from program control 10 to plural drive-sense circuits 23, 26, and 27. The latter circuits are coupled respectively to the column circuits 18, 19, and 20. Only circuit 23 is shown in detail since all of the circuits 23, 26, and 27 are the same. The signals on circuits 24 are applied during a write-in interval and comprise control signals for drive current pulse generators 28. If a binary ZERO signal is present on a circuit 24 the corresponding generator 28 is not activated. If a binary ONE is present the generator in the corresponding drive-sense circuit applies a half-select drive pulse, i.e., digit drive pulse, to the corresponding column circuit of the memory to represent one bit of the information word to be stored therein.

Program control 10 also supplies an actuating signal at write-in time to another drive current pulse generator 29 to cause the latter generator to produce another half-select drive current pulse, i.e., word drive pulse, for application to the row circuit selected by translator 21. The pulse from generator 29 supplies approximately half of the needed switching magnetomotive force for all of the cores in the selected row. The generators 28 simultaneously supply the remaining portion of the necessary switching magnetomotive force to the appropriate column circuits so that the cores in the selected row are switched wherever a binary ONE is to be written in the stored word, as indicated by the composition of word-defining signals on circuits 24. The cores in the columns where binary ZEROS are to be stored in the selected word receive no drives pulses from their generators 28 and such cores are, therefore, not switched.

Each of the drive-sense circuits 23, 26, and 27 includes a negative feedback sensing amplifier 30 with its input coupled to the corresponding column circuit of memory 11. In FIG. 1 a gated feedback circuit 31 of the sensing amplifier 30 is separately illustrated and receives gating control signals from the program control 10 by a circuit 32. During the write-in interval of the memory the feedback for all of the amplifiers 30 is at a high level so that they are all operating in their low gain condition. Since the output of the digit pulse generator 28 and the input of sensing amplifier 30 are connected in multiple to a column circuit of memory 11, the digit pulse during the write-in interval is necessarily also coupled to the amplifier input. In a typical memory application the column write-in signals coupled to the sensing amplifier input are at least two orders of magnitude larger than the read-out signals. In the absence of high negative feedback on the amplifier, the write time signals would overdrive the amplifier and thereby produce changes in direct-current operating point and input impedance as will be discussed. However, the amplifier gain with the aforementioned negative feedback is held to a low level. That level is so low that the amplifier output in response to such a write time digit pulse, or any other anticipated noise pulse in the column circuit, is of insufficient amplitude to drive the amplifier 30 out of its linear amplification range. This prevents signal distortion and prevents either saturation or cut off of amplification devices which would change the input impedance presented to the column circuit and charge amplifier circuit impedances thereby causing a shift in the direct-current operating point. Consequently it is unnecessary to allow a time guard interval after a noise to permit the amplifier circuit to settle back to its normal operating condition. During the write-in interval of the memory no discriminator output signals are applied to the utilization circuit 36 from the drive-sense circuits 23, 26, and 27 because the discriminators are disabled at that time as will be described.

During a read-out operation for the memory 11 program control 10 applies a signal on the circuit 32 to reduce the amount of feedback by circuits 31 of the sensing amplifiers. Simultaneously the control 10 applies address signals to the row translator 21. Later during the same interval control 10 enables a read drive current pulse generator 37 and also applies a strobe signal on a lead 39 to enable the discriminator 33. A full-select word pulse from generator 37 is then applied through translator 21 to a selected row of the memory 11. This pulse is of sufficient magnitude to produce in each core of the selected row the full magnetomotive force required for switching a core from the ONE to the ZERO condition of stability. Consequently, cores which are so switched induce a binary ONE pulse in their respective column circuits, and such pulses are coupled by the column circuits to the corresponding sensing amplifiers 30. Since these amplifiers have their negative feedback reduced as previously mentioned, the read-out pulses are amplified to a much greater extent than were the previously mentioned digit noise pulses. Consequently, a binary ONE pulse in the output of amplifier 30 is of sufficient amplitude to actuate discriminator 33 and thereby apply an input signal to utilization circuit 36. Circuit 36 can be any appropriate known means for utilizing the output of the memory in a data processing system. However, circuit 36 often includes among its functions means to couple signals to a circuit 38 so that program instructions read from memory 11 may be applied to program control 10 to implement further execution of the data processing program.

Figure 2:
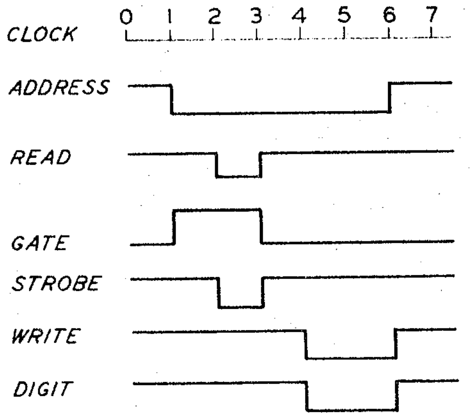
FIG. 2 is a timing diagram illustrating the operation of the invention.

The timing diagram in FIG. 2 depicts the system operation just described. Thus, a train of clock pulses is produced by a suitable clock, not shown, in program control 10 to facilitate the orderly control of operation sequences therein. The clock pulses which are illustrated are numbered 0 through 8.

Address signals are produced on circuit 22 between clock pulses 1 and 6 for a reading operation and for a subsequent write-in operation. The gate signal on circuit 32 for changing the gated feedback 31 during a read-out operation is also provided between clock pulses 1 and 3; and the actual read drive pulse from generator 37 appears between clock pulses 2 and 3. A strobe signal coincident with the read pulse is applied from control 10 by a circuit 39 to actuate discriminator 33 during the time interval when a binary ONE read-out signal may be produced. Coincident current write pulses are applied by the generators 28 and 29 between clock pulses 4 and 6, as indicated by the digit and write diagrams, respectively, in FIG. 2.

Figure 3:
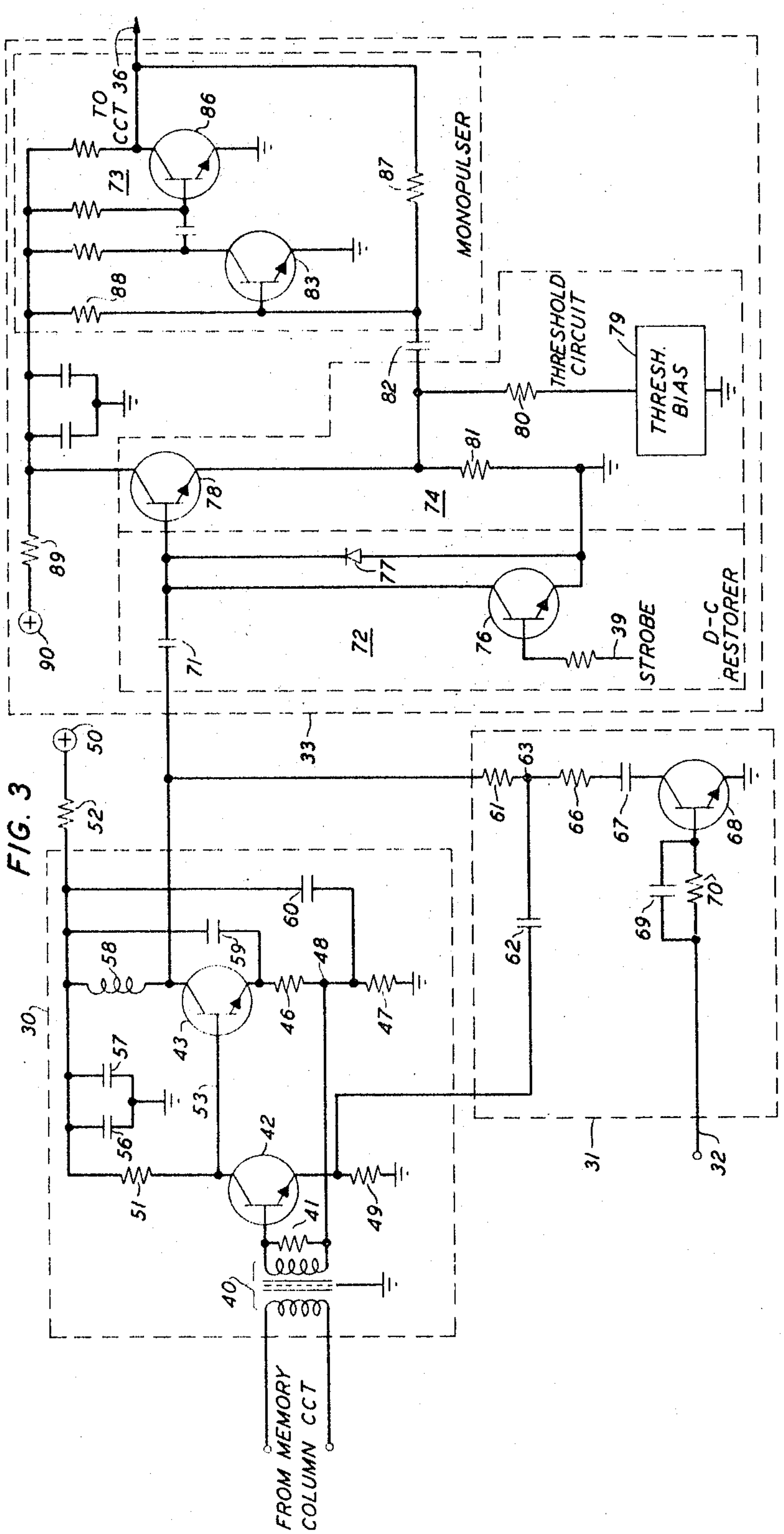
FIG. 3 is a schematic diagram of the amplifier and discriminator circuits of the invention.

FIG. 3 is a schematic diagram of the sensing portion of one of the drive-sense circuits, such as the circuit 23, in FIG. 1. It includes the sense amplifier 30, its gated feedback circuit 31, and the corresponding discriminator circuit 33. A transformer 40 has its primary winding coupled to receive signals from a column circuit of the memory 11 in FIG. 1. The secondary winding of the transformer is connected across a resistor 41 which has a resistance magnitude adapted to reflect into the primary winding of the transformer an impedance which is approximately the critical damping impedance for the corresponding memory column circuit. This arrangement provides critical damping for the column circuit so that the tendency of that circuit to ring and the tendency of signal transients to be unduly prolonged are both minimized. It will be shown that this reflected impedance remains substantially constant during a memory cycle.

Amplifier 30 includes two transistors 42 and 43 connected in common emitter amplification circuits. Two resistors 46 and 47 comprise a potential divider in the emitter circuit of transistor 43 for developing a direct-current stabilizing feedback potential at a common junction 48 between such resistors. The secondary winding of transformer 40 is connected between that terminal 48 and the base electrode of transistor 42 for supplying input signals to the latter transistor and for receiving direct-current feedback from terminal 48. A resistor 49 in the emitter circuit of transistor 42 provides means to develop an alternating current feedback potential difference in a manner which will be described. The input circuit of transistor 42 includes its emitter electrode, the resistor 49, ground, resistor 47, the secondary winding of transformer 40, and the base electrode of transistor 42. Resistor 41 has a resistance that is much smaller than the combined resistances of that input circuit so its resistance is substantially all that is seen in the transformer primary winding regardless of the conducting condition of transistor 42.

A positive potential source 50 is schematically represented by a circled plus sign to indicate a source of direct potential with its positive terminal connected at the point indicated by the mentioned schematic representation and its negative terminal connected to ground. A resistor 51 is connected in series with a resistor 52 to the source 50 and develops output signals for the amplifier stage including transistor 42. Those output signals are applied by means of a lead 53 to the base electrode of transistor 43. Two capacitors 56 and 57 are each connected between ground and the electric circuit point between resistors 51 and 52 to constitute with resistor 52 a low-pass filter to keep signal frequencies out of the potential source 50, and to prevent noises from source 50 from entering the amplifier.

A coil 58 is connected between resistor 52 and the collector electrode of transistor 43 to provide an inductive load for the amplifier stage including that transistor and thereby double the output voltage swing of the stage as compared to the swing which would be available with a resistive load. Capacitors 59 and 60 are connected respectively between the terminals of resistor 46 and a common circuit point between resistors 51 and 52 to provide further signal by-passing.

The output of amplifier 30 at the collector electrode of transistor 43 is applied in a degenerative fashion through the feedback circuit 31 to the emitter electrode of transistor 42. Within the circuit 31 a resistor 61 and a capacitor 62 are connected in series to provide the alternating current negative feedback path for the amplifier 30. A circuit junction 63 between resistor 61 and capacitor 62 is arranged to be shunted to ground through a low impedance alternating current path in response to the gating signal on circuit 32. The shunt path includes in series a resistor 66, a capacitor 67, and the internal collector-emitter circuit of a transistor 68. The emitter electrode of the latter transistor is connected to ground and circuit 32 is coupled to the base electrode of transistor 68 through a speedup capacitor 69 and a leakage resistor 70 for that capacitor. In a typical illustrative circuit arrangement the resistance of resistor 61 is advantageously made smaller than the resistor 49 and at least one order of magnitude larger than the resistor 66. An arrangement of this type permits the amplifier 30, including its feedback circuit 31, to have a high alternating current gain, for example 45 or more, when transistor 68 is conducting during a read-out interval and a low alternating current gain, e.g., only one and a half, at other times when transistor 68 is in a non-conducting condition.

Capacitor 67 is included in the shunt path to block direct current so that the operation of the gated shunt on the feedback circuit will produce no substantial variation in the direct-current operating level of the amplifier and its alternating current feedback circuit which could be amplified to interfere with the desired signal indication. Thus, if capacitor 67 were absent from the circuit, the operation of transistor 68 into conduction would pull the junction 63 from its normal direct potential level similar to the level of the collector electrode of transistor 43 almost to ground potential. Such a swing causes the feedback circuit to couple a large negative-going signal to the emitter electrode of transistor 42 and causes that transistor to conduct harder. This action reduces conduction in transistor 43 with a resulting large positive output pulse from amplifier 30 which may produce spurious operation of discriminator 33.

However, capacitor 67 is advantageously arranged to become fully charged in less than a quarter of the duration of the first gating signal interval, and the capacitor thereafter has no convenient discharge path so substantially all of its charge is retained between gating signal intervals. Consequently, the average direct potential level of junction 63 remains substantially the same as that of the collector electrode of transistor 43 regardless of the conduction condition in transistor 68, and the feedback gating operation produces no significant disturbance upon the direct-current operating point of amplifier 30.

A capacitor 71 couples the output of amplifier 30 to the input of discriminator 33 which includes a direct-current restorer 72, a threshold circuit 74, and a monopulser 73. A transistor 76 is held in saturated conduction at all times except during the aforementioned strobe interval to shunt the input of discriminator 33 to ground and thereby provide assurance against noise disturbance. During the strobe interval the enabling signal on lead 39 for transistor 76 is removed so that input signals from amplifier 30 may be received. The restorer 72 includes a diode 77 which is poled to shunt negative-going signals to ground. Consequently, the input signals appear at the base electrode of a transistor 78 as referenced to ground.

Transistor 78 in threshold circuit 74 is connected in an emitter follower circuit configuration and normally biased in a nonconducting condition. A threshold bias signal source 79 applies a positive voltage to a potential divider including two series-connected resistors 80 and 81 for supplying the normal cut off bias to the emitter electrode of transistor 78. This bias level must be exceeded by positive-going input signals at the base electrode of the transistor in order to produce conduction in the transistor. The bias level is set so that an amplified binary ONE signal coupled to the discriminator by capacitor 71 can overcome the threshold bias and cause the transistor 78 to conduct, but an amplified ZERO signal cannot exceed the threshold bias on the transistor.

A capacitor 82 couples the output of threshold circuit 74 to the input of monopulser 73 which includes two transistors 83 and 86. These transistors are arranged so that the transistor 86 is normally biased in a saturated conduction condition. A resistor 87 provides the monopulser regenerative feedback from the collector electrode of transistor 86 to the base electrode of transistor 83 in the usual manner. However, an additional resistor 88 is connected in series with a resistor 89 between a potential source 90 and the base electrode of transistor 83 to form with the resistor 87 and the conducting transistor 86 a potential divider which normally holds transistor 83 at a bias level which is just below its conducting bias level to minimize the input signal swing which is required to trigger the monopulser.

Thus, during the read-out interval of the memory 11 in FIG. 1 the gate signal changes the negative feedback circuit 31. Amplifier 30 is thereby given a high gain characteristic and a binary ONE signal from a memory column circuit is amplified thereby to overcome the threshold bias on transistor 78 in threshold circuit 74 and produce a triggering signal for the monopulser 73. That signal causes transistor 83 to conduct and transistor 86 to be turned off, thereby producing a positive-going output signal to utilization circuit 36. The arrangement of the discriminator circuit whereby the threshold function is separated from the monopulser operation permits the monopulser to turn on more rapidly than is normally the case when such thresholding circuits are integrally included within the triggering type of circuit.

Although this invention has been described in connection with a particular embodiment thereof it is to be understood that additional embodiments and modifications of the invention which will be obvious to those skilled in the art are included within the spirit and scope of the invention.

What is claimed is:

1. In a store for multibit binary coded information words, a coordinate array of bistable magnetic storage devices arranged in rows and columns, said devices being switchable between their stable conditions in response to a magnetomotive force of predetermined magnitude, a different single electric circuit linking all of said devices in each row of said array, means selectively applying to one of said row circuits at a time either a first pulse of one polarity to produce approximately one-half of said force or a second pulse of opposite polarity to produce the full magnitude of said force, both said first and second pulses having approximately the same frequency spectrum, a different single circuit linking all of said devices in each of said columns, means applying to selected column circuits pulses of substantially the same magnitude and frequency spectrums as said first pulse and in time coincidence therewith to produce an aiding magnetomotive force in the device linked by both said one row circuit and said selected column circuits, plural amplifiers each having its input coupled to a different one of said column circuits and each having negative feedback means, each of said amplifiers presenting a substantially constant predetermined impedance to its column circuit, and means controlling said feedback means to provide a much lower level of feedback at the time of occurrence of said second pulse than is provided at the time of said first pulse.

2. In an information store for multibit binary coded information words, a coordinate array of bistable magnetic devices arranged in rows and columns, said devices being switchable from one of their two stable magnetic conditions to the other by an applied magnetomotive force of predetermined magnitude, a separate row circuit coupled to all of the devices in each of said rows and a separate column circuit coupled to all of the devices in each of said columns, plural amplifiers each having its input coupled to a different one of said column circuits, each amplifier having a negative feedback circuit, means selectively applying to one of said row circuits at a time either a writing current for producing in the devices coupled to such circuit a magnetomotive force having a magnitude less than said predetermined magnitude, or a reading current of opposite polarity from said writing current for producing in such devices said predetermined magnetomotive force, means for applying to said column circuits a writing current for producing in the devices coupled thereto a magnetomotive force having a magnitude less than said predetermined magnitude such column circuit currents being coincident in time with said row circuits writing current, and means controlling said feedback circuits to hold said amplifiers in a linear operating range with high gain during the application of said read current and with low gain during the application of said write currents.

3. The store system in accordance with claim 2 wherein each of said amplifiers presents a substantially constant input impedance to its corresponding column circuit.

4. The store system in accordance with claim 3 wherein said input impedance of each of said amplifiers is substantially the critical damping impedance of its corresponding column circuit.

5. In a magnetic memory system for storing binary coded information words and wherein the digit write function and the sensing function are both performed on the same memory sensing circuits in successive time intervals, plural negative feedback amplifiers each coupled to a different one of said memory sensing circuits so that the impedance seen by such sensing circuit is affected by a part of such amplifier controlled by the negative feedback, each of said amplifiers having gate means for controlling the operation of the negative feedback therein without changing said impedance, means applying digit drive current pulses to said memory system, and means controlling said applying means and said gating means whereby said amplifiers have high negative feedback during the application of current pulses from said applying means in a first one of said time intervals and have low negative feedback in a second one of said intervals.

6. In a magnetic memory system for storing binary coded information words and wherein the digit write function and the sensing function are both performed on the same memory circuit in successive time intervals, a negative feedback amplifier having its input coupled to said memory circuit and having gate means for controlling the operation of the negative feedback therein, said amplifier having a substantially constant input impedance during said successive time intervals, a drive current source coupled to said circuit and means controlling said source and said gating means whereby said amplifier has high negative feedback during the application of current pulses from said source to said circuit in a first one of said time intervals and has low negative feedback at another time in a second one of said intervals.

7. In a magnetic memory system for storing binary coded information words and wherein the digit write function and the sensing function are both performed on the same memory circuit in successive time intervals, a negative feedback amplifier coupled to said memory circuit, said amplifier including input and output common emitter transistor amplifier stages with the input circuit of said input stage including a portion of the emitter circuit of said output stage to provide a first negative feedback coupling, and said amplifier including means coupling the collector circuit of said output stage to the emitter circuit of said input stage to provide a second negative feedback coupling, and said amplifier having gate means controlling the operation of said second negative feedback coupling, a drive current source coupled to said circuit, and means controlling said source and said gating means whereby said amplifier has high negative feedback during the application of current pulses from said source to said circuit in a first one of said time intervals and has low negative feedback at another time in a second one of said intervals.

8. In a magnetic memory system for storing binary coded information words and wherein the digit write function and the sensing function are both performed on the same memory circuit in successive time intervals, a negative feedback amplifier having its input coupled to said memory circuit, a negative feedback circuit coupling the output of said amplifier to the input thereof, a low impedance alternating current shunt circuit on said feedback circuit, gating means connected in series in said shunt circuit for disabling said shunt circuit to control the level of feedback in said feedback circuit, a drive current source coupling a pulse to said memory circuit, and means controlling said source and said gating means whereby said amplifier has high negative feedback during the application of said current pulse from said source to said circuit in a first one of said time intervals and has low negative feedback at another time in a second one of said intervals.

9. In a magnetic memory system for storing binary coded information words, a first circuit wherein half-select write signals are applied and sensing signals are produced in successive write and read time intervals, a second circuit wherein half-select write and full-select read signals are applied in said write and read intervals, respectively, first and second pulse supplying means supplying half-select signals to said first and second circuits and full-select signals to said second circuit, all of said half-select and full-select signals having substantially the same frequency content, said full-select signals producing noise pulses in said first circuit which are substantially larger than said half-select signals, a negative feedback amplifier having its input coupled to said first circuit and having gate means for controlling the operation of the negative feedback therein, and means controlling said pulse supplying means and said gating means during said intervals to control said amplifier negative feedback for holding said amplifier in a linear operating range during said read and write time intervals.

10. In a magnetic memory system for storing binary coded information words and wherein two memory functions are performed on the same memory circuit in successive time intervals, a negative feedback amplifier continuously coupled to receive signals from said memory circuit and having gate means for controlling the operation of the negative feedback therein, said amplifier having a substantially constant input impedance, a drive current source coupled to said circuit, and means controlling said source and said gating means whereby said amplifier has high negative feedback during the application of current pulses from said source to said circuit in a first one of said time intervals and has low negative feedback at another time in a second one of said intervals.

11. In a magnetic memory system for storing information words encoded in terms of first and second different binary signals, a memory circuit in which memory drive and sensing functions are performed in successive time intervals, a negative feedback amplifier having its input coupled to said memory circuit and having gate means for controlling the operation of the negative feedback therein, a drive current source coupled to said circuit, means controlling said source and said gating means whereby said amplifier has high negative feedback during the application of current pulses from said source to said circuit in a first one of said time intervals and has low negative feedback at another time in a second one of said intervals, and a voltage threshold circuit coupled to the output of said amplifier and adapted to conduct in response to only one of said different binary signals.

12. In a magnetic memory system for storing binary coded information words and wherein plural memory functions are performed on the same memory circuit in successive time intervals, a negative feedback amplifier having input and output circuit connected to ground and having said input circuit coupled to said memory circuit, a negative feedback circuit coupling the output of said amplifier to the input thereof and including a first resistor and a capacitor connected in series in the order named from the output to the input of said amplifier, means shunting to ground a point in said feedback circuit between said resistor and said capacitor, said shunting means comprising in series a second resistor having much lower resistance than said first resistor, a direct current blocking capacitor, and gating means for disabling said shunting means to enable substantial signal coupling through said feedback circuit, a drive current source coupling a pulse to said memory circuit, and means controlling said source and said gating means whereby said amplifier has high negative feedback during the application of said current pulse from said source to said circuit in a first one of said time intervals and has low negative feedback at another time in a second one of said intervals.

13. The magnetic memory system in accordance with claim 12 in which a transformer couples said memory circuit to said amplifier input circuit, and said memory circuit is floating with respect to ground.

14. In a magnetic memory system for storing information words encoded in terms of binary ONE and ZERO signals, a memory circuit in which memory drive and sensing functions are performed in successive time intervals, a negative feedback amplifier having its input coupled to said memory circuit and having gate means for controlling the amount of the negative feedback therein, a drive current source coupled to apply a current pulse to said circuit during a first one of said intervals, means controlling said source and said gating means whereby said amplifier has a high negative feedback condition during the application of said current pulse from said source to said circuit in said first time interval and has a low negative feedback condition at another time in a second one of said intervals, a pulse regenerating circuit, and a threshold circuit coupling the output of said amplifier to the input of said regenerating circuit, said threshold circuit having a threshold of operation for coupling signals which is higher than amplified ZERO signals produced during said low negative feedback condition but lower than amplified ONE signals during said low negative feedback condition.

References Cited

UNITED STATES PATENTS

| | | | |
|---|---|---|---|
| 3,174,137 | 3/1965 | Khambaty et al. | 340—174 |
| 3,193,807 | 7/1965 | Vinal | 340—174 |
| 3,304,543 | 2/1967 | Louis et al. | 340—174 |

BERNARD KONICK, Primary Examiner

V. P. CANNEY, Assistant Examiner